(12) United States Patent
Bradley (10) Patent No.: US 7,621,675 B1
(45) Date of Patent: Nov. 24, 2009

(54) SINGLE-PIECE CABLE RETENTION HOUSING FOR HARDENED OUTSIDE PLANT CONNECTOR

(75) Inventor: Kelvin B. Bradley, Lawrenceville, GA (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 12/371,037

(22) Filed: Feb. 13, 2009

(51) Int. Cl.
*G02B 6/36* (2006.01)
*G02B 6/38* (2006.01)
(52) U.S. Cl. .............. 385/81; 385/60; 385/62; 385/76; 385/77; 385/78; 385/86
(58) Field of Classification Search ............. 385/55–56, 385/58, 62, 66, 69–70, 76–78, 81, 86
See application file for complete search history.

(56) References Cited

U.S. PATENT DOCUMENTS

| | | | |
|---|---|---|---|
| 7,090,406 B2 | 8/2006 | Melton et al. | |
| 7,113,679 B2 | 9/2006 | Melton et al. | |
| 7,120,347 B2 | 10/2006 | Blackwell et al. | |
| 7,146,090 B2 | 12/2006 | Chanh et al. | |
| 7,150,567 B1 | 12/2006 | Luther et al. | |
| 2008/0044137 A1* | 2/2008 | Luther et al. | ................. 385/60 |
| 2008/0273855 A1 | 11/2008 | Bradley et al. | |

\* cited by examiner

*Primary Examiner*—Frank G Font
*Assistant Examiner*—Michael P Mooney
(74) *Attorney, Agent, or Firm*—Sutherland Asbill & Brennan LLP (57) ABSTRACT

According to an example embodiment of the invention a one-piece retention housing is utilized for terminating an optical fiber cable. The retention housing attaches to strength members within the cable, providing tensile strength and a means for further mating with components of an optical fiber connector assembly. The retention housing is used as part of a kit for terminating and securing the optical fiber cable connector to a complementary receptacle or terminal for drop-cable deployments in optical access networks and outside plant applications.

20 Claims, 7 Drawing Sheets

SINGLE-PIECE CABLE RETENTION HOUSING FOR HARDENED OUTSIDE PLANT CONNECTOR

FIELD OF THE INVENTION

The present invention relates generally to optical fiber connectors, and more specifically, to hardened connectors for drop-cable deployments in optical access networks and outside plant applications.

BACKGROUND OF THE INVENTION

Optical communication networks are assembled, in part, by connecting sections of optical fiber between two or more locations. Fusion splicing may provide an optimum method of coupling spans of optical fiber together, particularly when the spans are to be permanently connected. However, many situations exist, particularly in outdoor installments where the optical fiber connections need to be easily re-configurable, connected to different terminal points at will, and/or provide strain relief or axial support for the fiber cable. In such installation scenarios, the fusion splicing method may not be a practical option, particularly if the connection point is difficult to access (for example, in a manhole or located at an aerial terminal). Therefore, in order to increase the reliability of the connections, and to provide a reconfigurable installation method, optical fiber cables with factory-terminated, environmentally-sealed and hardened connectors and corresponding mating terminals are typically utilized for drop-cable deployments.

Several connector manufacturers and vendors offer hardened connectors and associated terminals and adaptors for Fiber to the Premises (FTTP) or Fiber to the Home (FTTH) applications. U.S. Pat. No. 7,090,406 and U.S. Pat. No. 7,113,679 depict example connectors and adaptors that are used in many of the existing outside plant drop-cable deployments connecting Optical Network Terminals (OTNs) with multiport terminals. The example connectors depicted in these patents include an SC connector plug enclosed in a pronged plug housing, fitted with two silicon O-rings to provide a water tight seal. The cable retention is achieved via sandwiching the optical fiber and cable strength members between a two-piece crimp body, surrounded by a metal crimp ring. The process of securing the optical fiber and strength members within the prior-art two-piece "sandwich" crimp body connector requires several steps, including stripping, trimming, and preparing the cable and fiber; applying epoxy to the crimp body; pre-curing the epoxy; feeding the bare optical fiber through a connector sub-assembly; assembling the connector sub-assembly, cable, and strength members between the crimp body sandwich; applying and crimping the crimp ring; post-curing the epoxy; cleaving, polishing, and inspection. Each of the aforementioned steps can be time consuming and may require a highly trained technician using extreme care to avoid breaking the fragile optical fiber during the process.

Therefore, a need exists for an alternative connector design that will be easier for the technician to assemble, that may eliminate one or more of the assembly steps required, and that may have a reduced component count.

BRIEF SUMMARY OF THE INVENTION

According to an example embodiment of the invention, a one-piece retention housing is provided for use in terminating a cable having at least one strength member and at least one optical waveguide. The retention housing includes an elongated body having a longitudinal axis extending from a first end to a second end. The body is defined by at least one waveguide bore extending from the first end to the second end and configured to receive the optical waveguide. The body is also defined by at least one strength member bore extending from the first end toward the second end and configured to secure the at least one strength member to the housing. The body includes a crimping region disposed along at least a portion of a length of the strength member bore extending from approximate the first end towards the second end. The body also includes a connector bore disposed approximate the second end and configured to receive an optical connector sub-assembly that terminates the optical waveguide.

According to an example embodiment of the invention, a one-piece retention housing is utilized for terminating an optical fiber cable. The retention housing attaches to strength members within the cable, providing tensile strength and a means for further mating with components of a connector assembly or kit for terminating and securing an optical fiber cable connector to a complementary receptacle or terminal.

The one-piece retention housing may include an elongated body having a longitudinal axis extending through the body from a first end to a second end. The body may define at least one waveguide bore extending from the first end to the second end and configured to receive the optical waveguide. The body may also include at least one strength member bore extending from the first end toward the second end and configured to secure the at least one strength member to the housing. The body may further include a crimping section disposed along at least a portion of a length of the strength member bore extending from approximate the first end towards the second end; and, a connector bore disposed approximate the second end and configured to receive an optical connector sub-assembly that terminates the optical waveguide.

BRIEF DESCRIPTION OF THE FIGURES

Reference will now be made to the accompanying drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

An embodiment of the invention may enable the use of a one-piece retention housing. The unitary retention housing may be used in the termination of an optical cable, and it may engage strength members of the optical cable to provide mechanical retention for a hardened optical connector assembly, and to further provide strain relief for an optical fiber within an associated optical cable assembly.

The termination of optical fibers with connectors is a difficult task due to the assembling a multiple-piece, optical fiber connector, particularly when numerous steps are involved, and when the bare, protruding optical fiber end can be easily broken at every step. According to an embodiment of the invention, the unitary retention housing, by virtue of its single body design, may reduce the steps and time associated with the assembly of a connector, may reduce the number of parts required, and may also reduce the risk of breaking the optical fiber during assembly.

Figure 1:
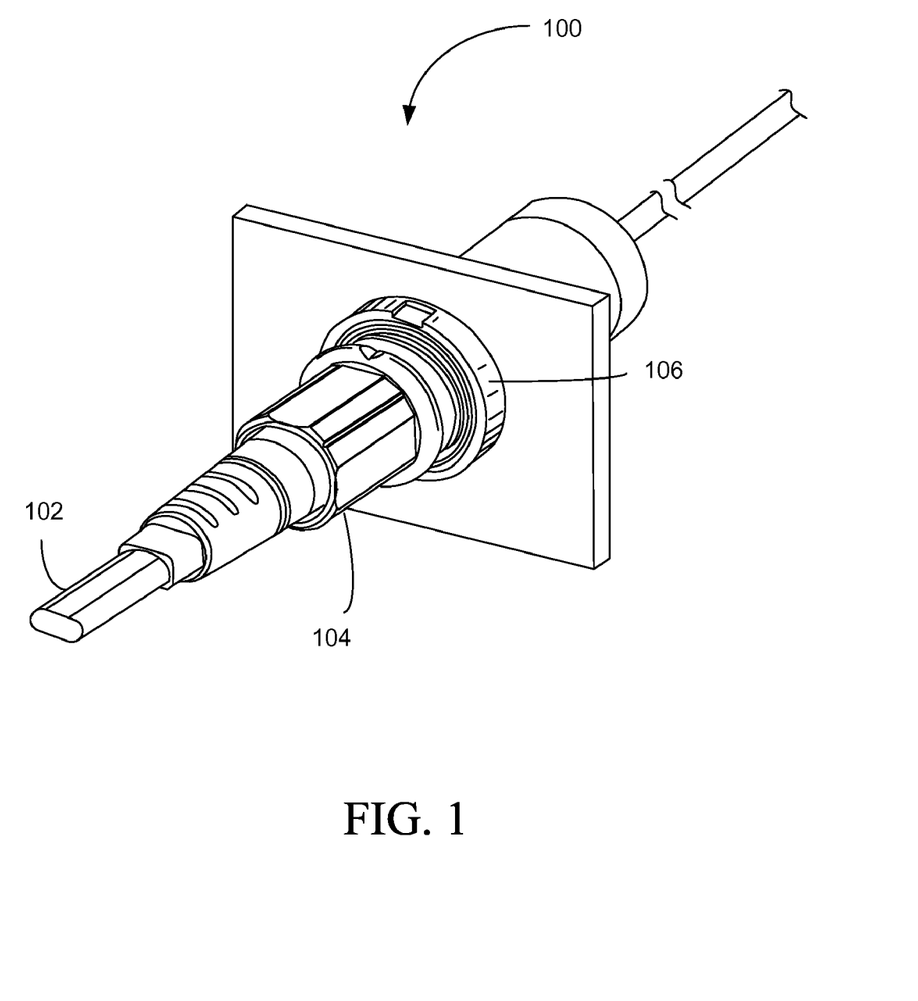
FIG. 1 depicts an illustrative connector assembly mated to an example adaptor or terminal assembly, according to an example embodiment of the invention.

FIG. 1 illustrates an example connector-termination system 100 that includes optical fiber cable assembly 102, a mated connector assembly 104, and a mated terminal assembly 106. The connector-termination system 100 may be utilized, for example, in an outside-plant cable drop deployment of an optical access network where hardened connectors are utilized to connect multi-port terminals, typically located on utility poles or in below-ground hand holes, with Optical Network Terminals (ONTs) located at the premises. The mating between the plug connector and the mating receptacle may be secured using a threaded engagement nut. Alternative methods for securing the plug connector to the mating receptacle may include quick release, push-pull latch, bayonet, and quarter-turn lock, for example. The connector-termination system 100 allows the installer to make an optical connection without special skill, equipment, or training.

Figure 2A:
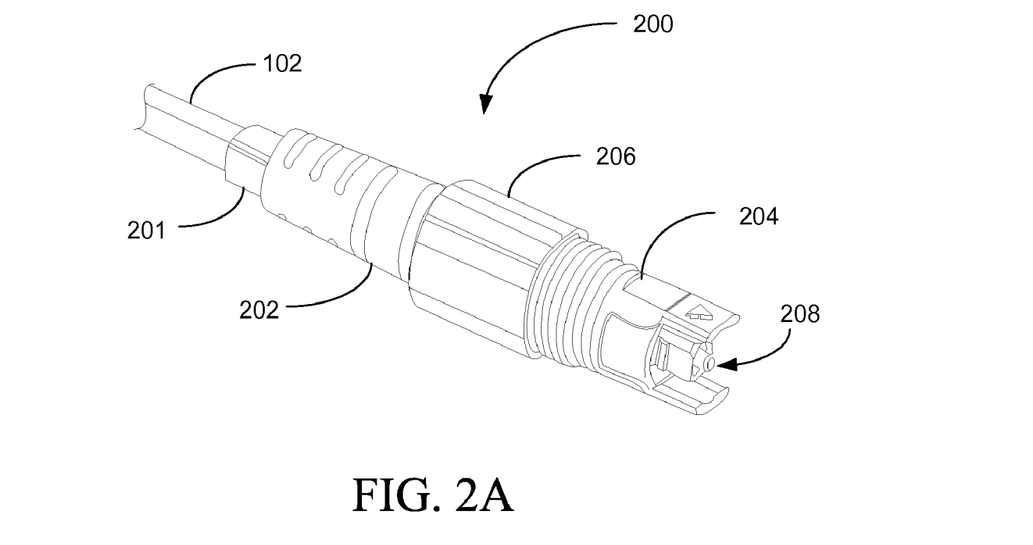
FIG. 2A is a perspective view of the assembled connector, according to an example embodiment of the invention.

FIG. 2A is a perspective view of an example optical connector assembly 200 according to an example embodiment of the invention, comprising the optical fiber cable assembly 102, a section of heat-shrink tubing 201 which may be adhesive lined, a boot assembly 202, a connector housing 204, a retaining nut 206, and an optical connector sub assembly 208. The heat shrink tubing 201 may attach to portions of the optical fiber cable assembly 102 and the connector housing 204 to secure the connector housing 204 to the optical fiber cable assembly 102.

Figure 2B:
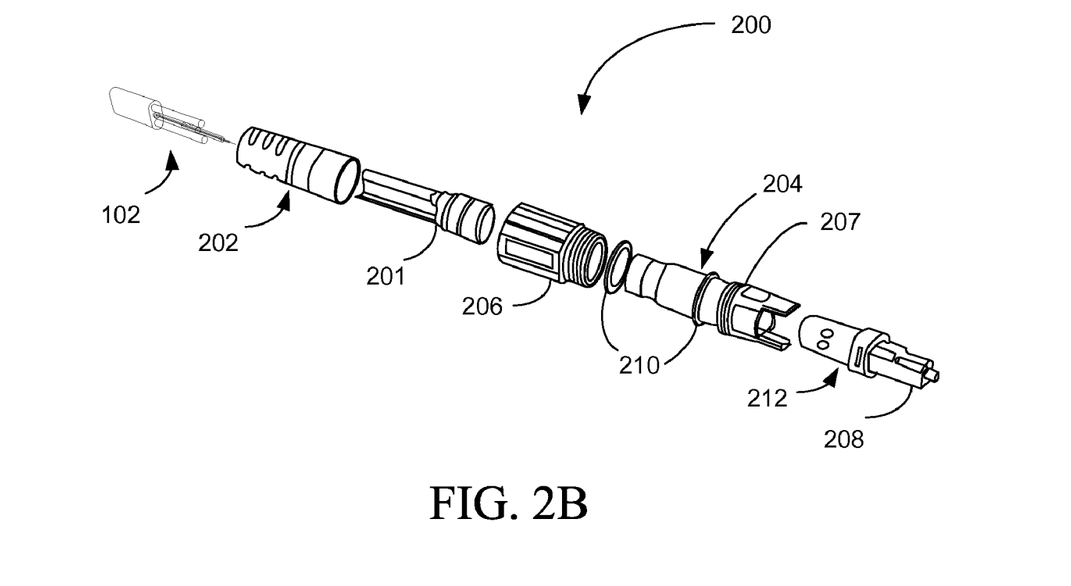
FIG. 2B is an exploded perspective view of the connector components including the one-piece retention housing, according to an example embodiment of the invention.

FIG. 2B is an exploded perspective view of the optical connector assembly 200 of FIG. 2A according to an example embodiment of the invention, comprising heat shrink tubing 201, the optical fiber cable assembly 102, the boot assembly 202, the connector housing 204, the retaining nut 206, the optical connector sub-assembly 208, O-rings 210, and a one-piece retention housing 212. As indicated with respect to FIG. 2A, the connector housing 204 may be operable to surround and engage a collar on the one-piece retention housing 212. The retaining nut 206 may surround and engage a collar on the connector housing 204, and thereby, the connector assembly 200 may be secured to a mating terminal receptacle.

Figure 3:
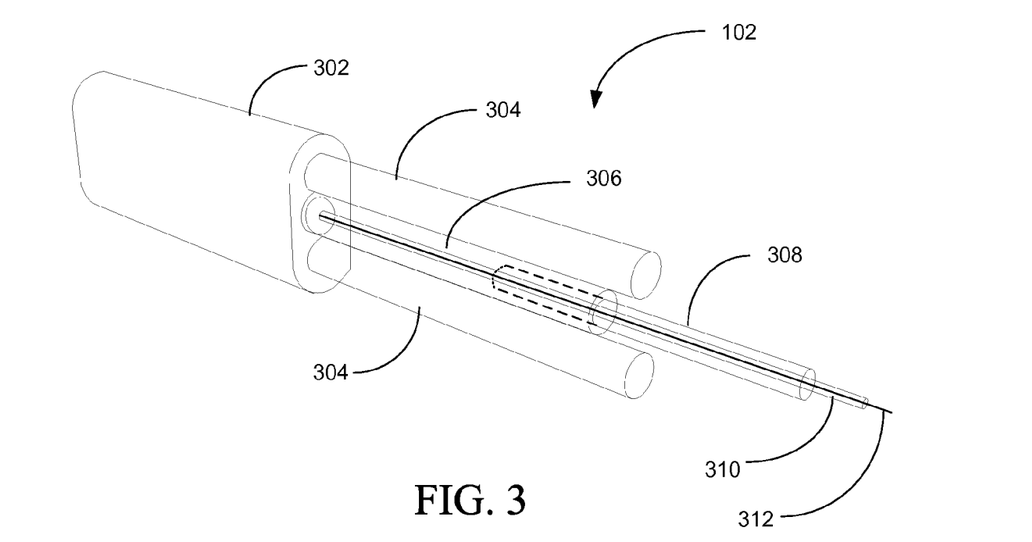
FIG. 3 is a perspective view of the optical fiber cable assembly, according to an example embodiment of the invention.

FIG. 3 depicts an example of an optical fiber cable assembly 102, pre-prepared for assembly with a connector. The example FIG. includes cable sheathing 302, strength members 304, a fiber core tube 306, an optical fiber 310 with coating, and a section of bare optical fiber 312 without coating. Also shown in FIG. 3, an optional section of buffer tubing 308 may be included. The buffer tubing 308 may surround the optical fiber 310 and may partially retract into the annular region between outer diameter of the optical fiber 310 and the inner diameter of the fiber core tube 306. The buffer tubing 308 may provide protection for the optical fiber during the connector assembly process, and may also provide a barrier for keeping unwanted epoxy away from the fiber. The buffer tubing 308 may be inserted onto the optical fiber 310 prior to assembling the optical connector sub-assembly 208 onto the end of the optical cable. In another example embodiment, the buffer tubing 308 may be inserted into an optical connector inner housing, as will be discussed with reference to FIG. 4.

Figure 4:
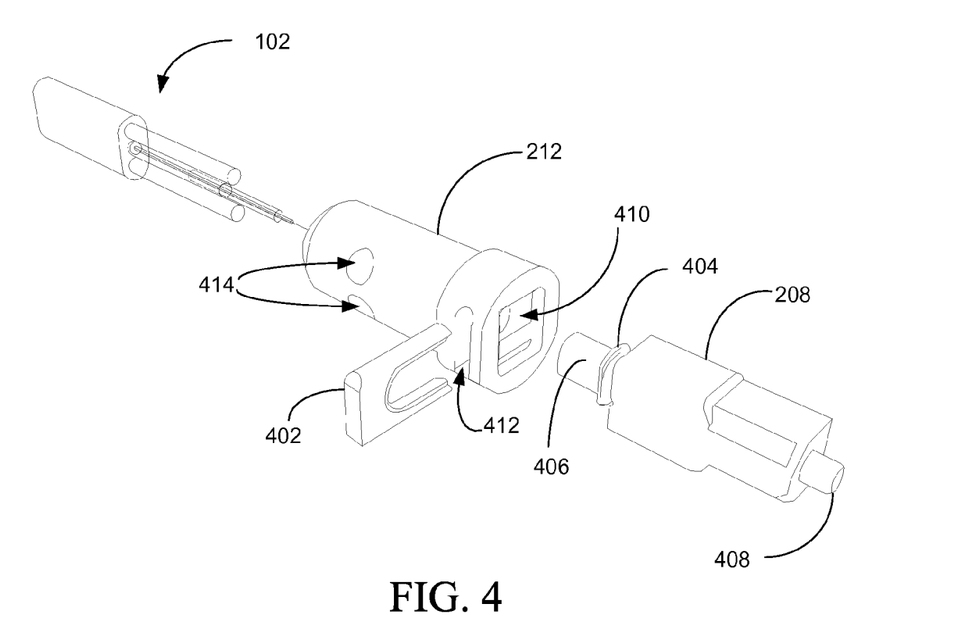
FIG. 4 is an exploded perspective view of the optical fiber cable, the one-piece retention housing, and the optical connector sub-assembly, according to an example embodiment of the invention.

FIG. 4 depicts an exploded view of the optical fiber cable assembly 102, the one-piece retention housing 212, and the optical connector sub-assembly 208. According to an embodiment of the invention, portions of the optical fiber cable assembly 102 may slide into apertures in the first end of the one piece retention housing 212, allowing the bare optical fiber 312 to protrude through the second end of the one piece retention housing 212 for feeding through a small hole in a ferrule 408 of the optical connector sub-assembly 208. As referenced with respect to FIG. 3 above, in an example embodiment, the buffer tubing 308 may be inserted into the optical connector inner housing 406 of the optical connector sub-assembly 208 prior to inserting the optical cable assembly 102 into the one-piece retention housing 212. The bare optical fiber 312 may protrude through the second end of the one-piece retention housing 212, and may be guided into the buffer tubing 308 to help guide the fiber through the small hole in the ferrule 408.

Again referring to FIG. 4, the optical connector sub-assembly 208 may engage with the one-piece retention housing 212 via the optical connector sub-assembly aperture 410. A first end of the optical connector sub-assembly 208, including an optical connector inner housing 406 portion of the optical connector sub-assembly 208 may partially retract into, and mate with the second end of the one-piece retention housing 212, and may be retained in a mating relationship by inserting a locking clip 402 into a clip aperture 412 to engage a retention flange 404 of the optical connector inner housing 406, thereby securing the optical connector sub-assembly 208 within the one-piece retention housing 212. According to an example embodiment, the locking clip 402 may instead, take the form of retention pins. According to another example embodiment, optical connector sub-assembly 208 may be secured to the one-piece retention housing 212 with epoxy, thereby eliminating the need for the locking clip 402 or retention pins. According to another example embodiment, the optical connector sub-assembly 208 may be secured to the one-piece retention housing 212 using snaps, or spring deformable latching edges built-in to the optical connector sub-assembly aperture 410 of the one-piece retention housing 212. The spring deformable latching edges may engage with the retention flange 404 and permanently or temporarily hold the optical connector sub-assembly 208 so that locking clips 402 and/or epoxy is not required for securing the optical connector sub-assembly 208.

Figure 5A:
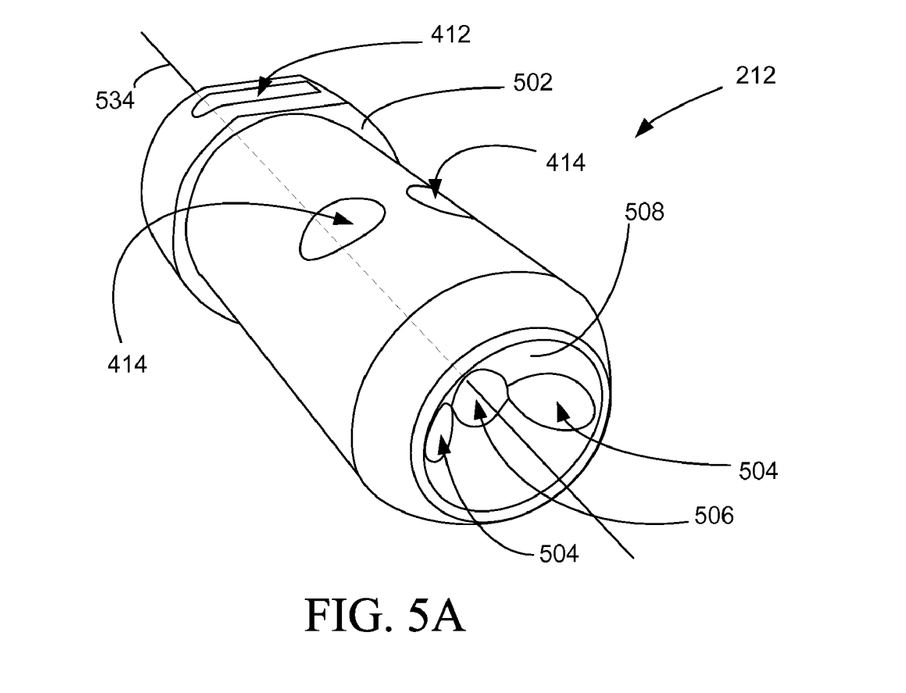
FIG. 5A is a first end perspective view of the one-piece retention housing, according to an example embodiment of the invention.

FIGS. 5A-F show various example perspective, cross-sectional, and end views of the one piece retention housing 212 according to embodiments of the invention. FIG. 5A depicts an example perspective view of the one-piece retention housing 212 where the optical fiber cable assembly 102 may be inserted into the housing. FIG. 5A depicts an insertion recess 508, strength member apertures 504 for inserting strength members 304, and an optical fiber aperture 506 for inserting the combined optical fiber comprising the fiber core tube 306, buffer tubing 308, optical fiber with coating 310 and bare optical fiber 312. The insertion recess 508 is defined by an arcuate, preferably conical or spherical recessed surface. Additionally, FIG. 5A depicts a keyed retention housing collar 502 for retaining the one-piece retention housing 212 within the connector housing 204. The keyed retention housing collar 502 may engage with a matched mating shoulder within the connector housing 204 to provide tensile retention of the one piece retention housing 212, and to also prevent the one-piece retention housing 212 from rotating about the longitudinal axis 534. FIG. 5A also depicts example epoxy apertures 414, which will be explained further with respect to FIG. 5C below. Further first end and second end views of the one-piece retention housing 212 are respectively shown in FIGS. 5E and 5F.

Figure 5B:
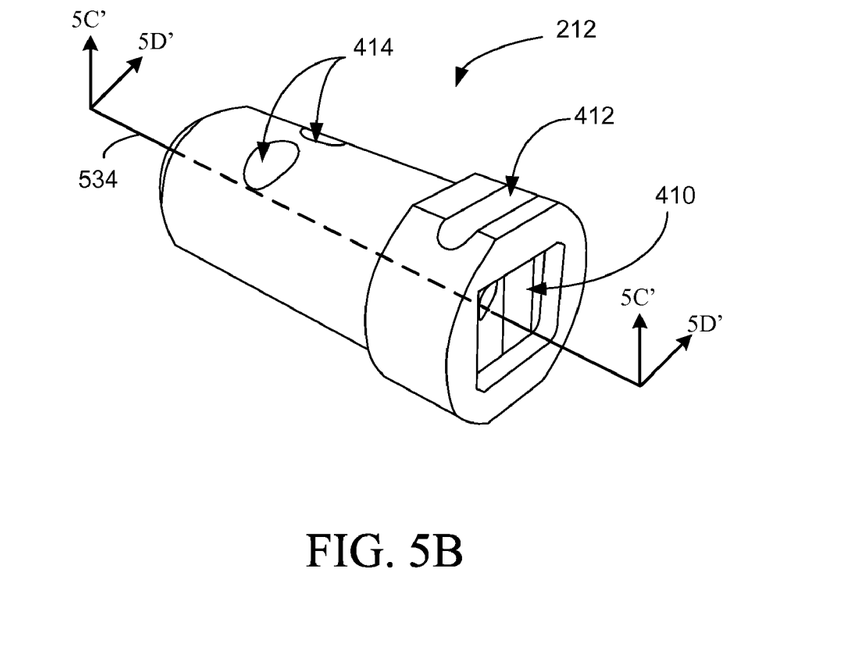
FIG. 5B is a second end perspective view of the one-piece retention housing, according to an example embodiment of the invention.

FIG. 5B depicts an example one-piece retention housing 212, with a perspective view of the housing where the optical connector sub-assembly 208 may be inserted into and retained within the housing at the optical connector sub-assembly aperture 410. Further sectional views of the one-piece retention housing 212, as indicated by view lines 5C'-5C' and 5D'-5D' are shown in FIGS. 5C and 5D.

Figure 5C:
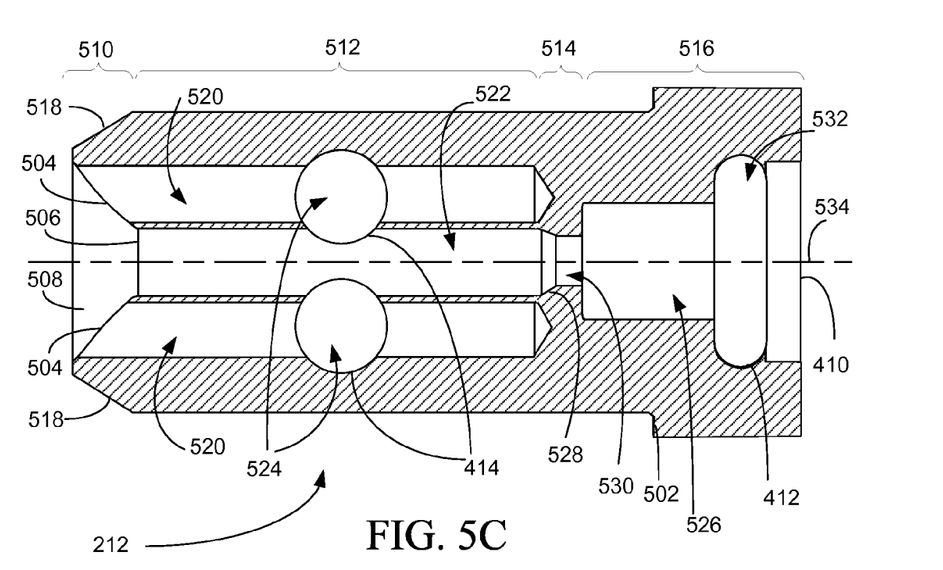
FIG. 5C is a cross-sectional view taken along line 5C'-5C' in FIG. 5B of the one-piece retention housing, according to an example embodiment of the invention.
Figure 5D:
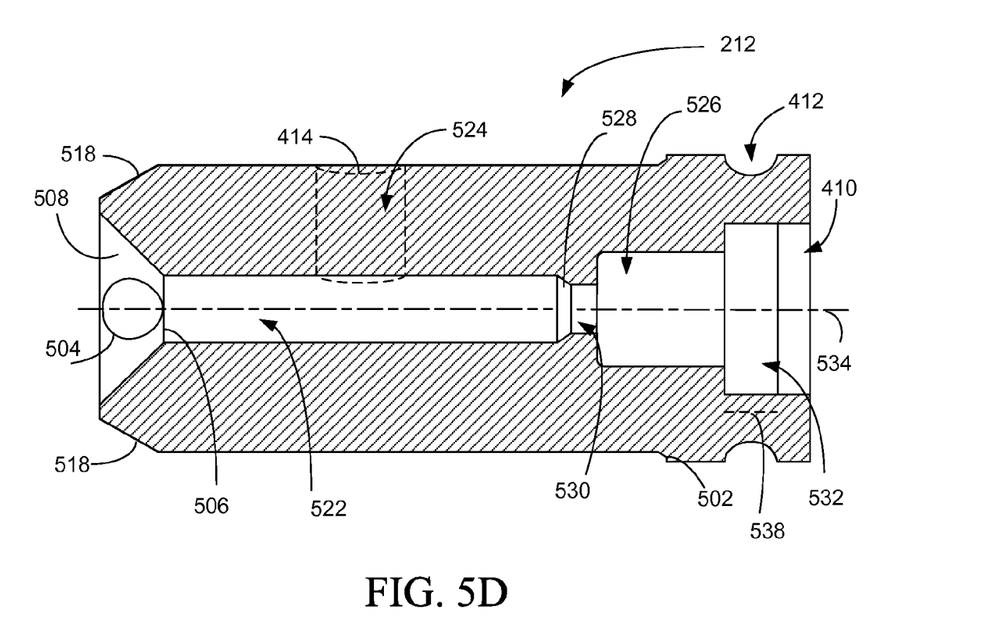
FIG. 5D is a cross-sectional view taken along line 5D'-5D' in FIG. 5B of the one-piece retention housing, according to an example embodiment of the invention.

FIG. 5C depicts a cross-sectional view of the one-piece retention housing 212, taken along line 5C'-5C' of FIG. 5B, according to an embodiment of the invention. The one-piece retention housing 212 may be described with reference to FIG. 5C in terms of functional longitudinal regions 510, 512, 514 and 516. The insertion region 510 may include the insertion recess 508, strength member apertures 504, optical fiber aperture 506, and a conical transition 518. According to an embodiment of the invention, the insertion region 510 serves at least two purposes: (1) to provide a means for accepting and guiding the strength members 304 and fiber core tube 306 of the prepared optical fiber cable assembly 102 into the respective apertures 504 and 506, and (2) to provide a transition region to facilitate the insertion of the end of the one-piece retention housing 212 into a connector housing 204.

With reference again to FIG. 5C, according to an embodiment of the invention, the one-piece retention housing 212 may also include a strength member crimping and epoxy region 512. This functional region may include strength member bores 520 associated with the strength member apertures 504, the optical fiber bore 522 associated with the optical fiber aperture 506, and epoxy bores 524 associated with epoxy apertures 414. According to an embodiment of the invention, the strength member crimping and epoxy region 512 serves one or more of the following purposes: (1) providing an aperture and bore into which the strength members 304 are received; (2) providing an aperture for receiving epoxy for securing the strength member 304; (3) providing a deformable body surface for crimping onto the strength members 304; (4) providing a surface for the wicking of epoxy around the strength members 304; (5) providing a surface via strength member bores 520 for additionally securing the strength members 304 to the one-piece retention housing 212 with epoxy; and (6) providing a passage-way for the optical fiber assembly (e.g., fiber core tube 306, buffer tubing 308, coated optical fiber 310, and bare optical fiber 312) through at least a portion of the one-piece retention housing 212. According to an embodiment of the invention, the strength member bores 520 may extend within the body of the one-piece retention housing 212 sufficient to provide an adequate epoxy and crimping surface and, but may terminate before the optical connector region 516. According to an embodiment of the invention, the one-piece retention housing 212 may include alignment marks on the outer surface of the body to indicate the optimum position for crimping, disposed along the longitudinal axis 534 and within the strength member crimping and epoxy region 512. According to an embodiment of the invention, the epoxy bores 524, in communication with the strength member bores 520 and the outer surface of the one-piece retention housing 212, may extend radially from a longitudinal center of the strength member bores 520. Accordingly, any number, but preferably less than 6 epoxy bores 524 may be defined within the body of the one-piece retention housing 212 and disposed at one or more desirable locations along the strength member crimping and epoxy region 512. According to a preferred embodiment of the invention, the diameter of the epoxy bores 524 is approximately the same diameter of the strength member bores 520. According to another embodiment of the invention, the diameter of the epoxy bores 524 may be smaller than the diameter of the strength member bores 520. According to another embodiment of the invention, the diameter of the epoxy bores 524 may be larger than the diameter of the strength member bores 520. According to another embodiment of the invention, the epoxy bores 524 may comprise elongated slots extending from the strength member bores 520. According to an embodiment of the invention, the epoxy bores 524 may be disposed at one or more desirable locations along the strength member crimping and epoxy region 512 and in a pattern that may enhance the crimping process.

With continued reference to FIG. 5C, according to an example embodiment of the invention, the one piece retention housing 212 also may include a fiber and buffer transition region 514. This functional region may provide a passage-way for the optical fiber sub-assembly (e.g., buffer tubing 308, optical fiber with coating 310, and bare optical fiber 312) to pass through the one-piece retention housing 212. The fiber and buffer transition region 514 may connect the optical fiber bore 522 with the optical connector sub-assembly bore 526. The transition region 514 may include a reduced-diameter optical fiber bore 530 that provides support for the optical fiber and coating 310, for example, via the buffer tubing 308. The reduced-diameter optical fiber bore 530 may be co-axial with the optical fiber bores 522 and the optical connector sub-assembly bore 526, and may be interfaced therewith via a fiber bore taper 528 if its diameter is less than that of the optical fiber bore 522.

With reference again to FIG. 5C, according to an embodiment of the invention, the one piece retention housing 212 also may be characterized by an optical connector assembly function region 516 that may include the optical connector sub-assembly aperture 410, the optical connector sub-assembly bore 526, the clip aperture 412, the clip bore 532, and the keyed retention housing collar 502. As associated with the epoxy bores 524 and the clip bore 532, the use of the term "bore", does not necessarily require a cylindrical cavity or passage, but may a may also include other shapes, for example an elongated slot, or a cubic recess. As explained with reference to FIG. 4 above, the optical connector sub-assembly 208 may engage with the one-piece retention housing 212 via the optical connector sub-assembly aperture 410. The optical connector inner housing 406 of the optical connector sub assembly 208 may partially retract into, and mate with the optical connector sub-assembly bore 526 within the one-piece retention housing 212, and may be retained by inserting locking clip 402 into clip aperture 412 to engage retention flange 404 of the optical connector sub assembly 208, thereby securing the optical connector sub-assembly 208 within the one-piece retention housing 212. According to another example embodiment, the optical connector sub-assembly 208 may be secured to the one-piece retention housing 212 using snaps, or spring deformable latching edges built-in to the optical connector sub-assembly aperture 410 of the one-piece retention housing 212. The spring deformable latching edges may engage with the retention flange 404 and permanently or temporarily hold the optical connector sub-assembly 208 so that locking clips 402 and/or epoxy is not required for securing the optical connector sub-assembly 208. The keyed retention housing collar 502 may be configured to retain the one-piece retention housing 212 within the connector housing 204. The keyed retention housing collar 502 may also be utilized for limiting or elimination rotation of the one-piece retention housing 212 within the connector housing 204.

FIG. 5D depicts an example side cross-sectional view of the one-piece retention housing 212 taken along line 5D'-5D' of FIG. 5B, according to an example embodiment of the invention. As illustrated, the epoxy bore 524 may connect the top surface of the one-piece retention housing 212 to the strength member bore 520.

Additional structural connectivity information may be understood with the aid of FIG. 5D. For example, the clip apertures 412 may be positioned on any one or more sides of the one-piece retention housing 212 to allow convenient insertion and removal of the clip 402. Therefore, the clip bore 532 may extend perpendicular to the longitudinal axis 534 through the one-piece retention housing 212. In another example embodiment where clip aperture 412 is only on one side, the clip bore 532 may not extend all the way from top to bottom, but may stop, for example, at an approximate depth through the housing, as depicted by example clip aperture stop line 538.

Figure 5E:
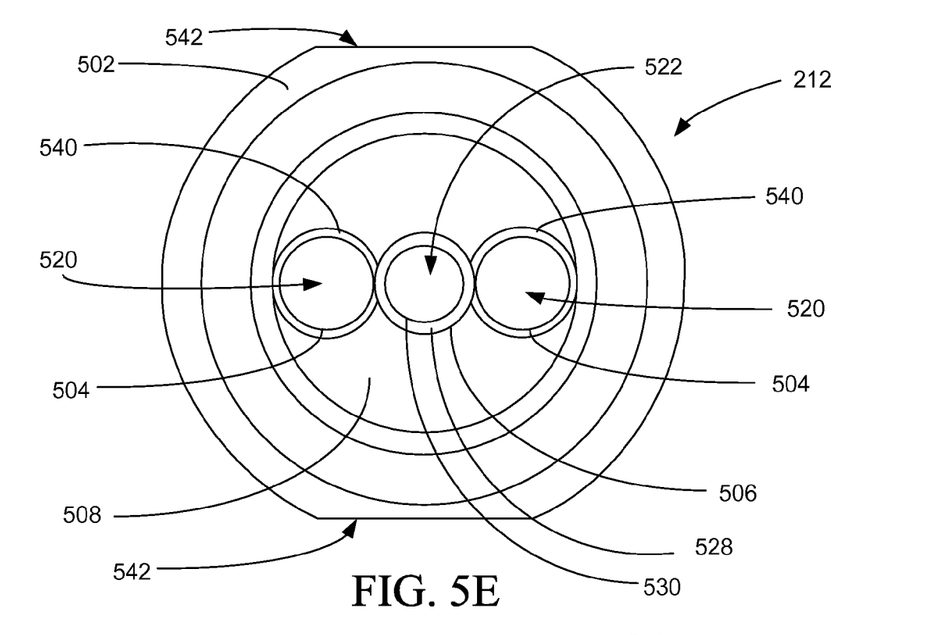
FIG. 5E is a first end view of the one-piece retention housing, according to an example embodiment of the invention.

FIG. 5E depicts an example first end view of the one-piece retention housing 212, according to an example embodiment of the invention. FIG. 5E shows example radial or lateral relative positions of the cooperating elements, including strength member apertures 504 and bores 520, optical fiber aperture 506 and bore 522, reduced diameter optical fiber bore 530, fiber bore taper 528, keyed retention housing collar 502, and the insertion recess 508. Additional elements shown in this diagram include collar key 542, which may be a flat portion on the keyed retention housing collar 502. The collar key 542 may mate with the connector housing 204 to eliminate axial rotation of the one-piece retention housing 212. In other example embodiments, depicted in FIG. 5E, the strength member apertures 504 may include slightly oversized guide section 540 transitioning to the diameter of strength member bore 520 to facilitate insertion of the strength members 304 into the one-piece retention housing 212. According to an example embodiment of the invention, strength member bores 520 and optical fiber bore 522 may overlap, with no sidewall separating the bores.

Figure 5F:
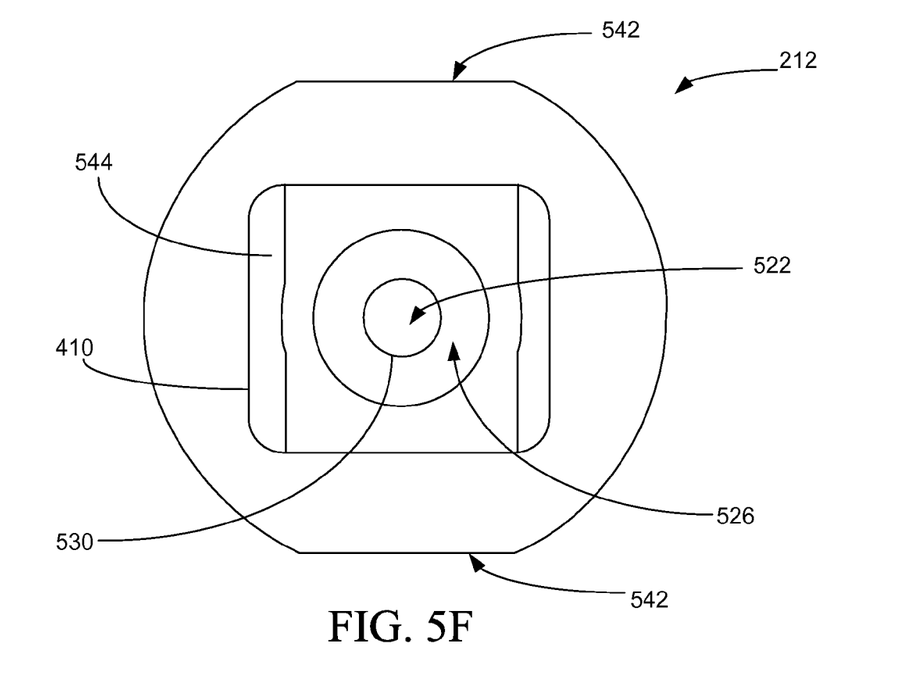
FIG. 5F is a second end view of the one-piece retention housing, according to an example embodiment of the invention.

FIG. 5F depicts an example second end view of the one-piece retention housing 212, according to an example embodiment of the invention. FIG. 5F shows example radial or lateral relative positions of the cooperating elements, including the optical fiber bore 522, the optical connector sub-assembly aperture 410, and the optical connector sub-assembly bore 526, and the collar key 542. An additional element shown in this diagram is the clip aperture surface 544. According to an example embodiment of the invention, the clip aperture surface 544 may be curved or arcuate, as indicated in FIG. 5C. According to other example embodiments, the clip aperture surface 544 may be flat or rectangular, and may have further surface roughness or additional surface features according to other example embodiments, to assist in retention of clip 402.

Figure 6:
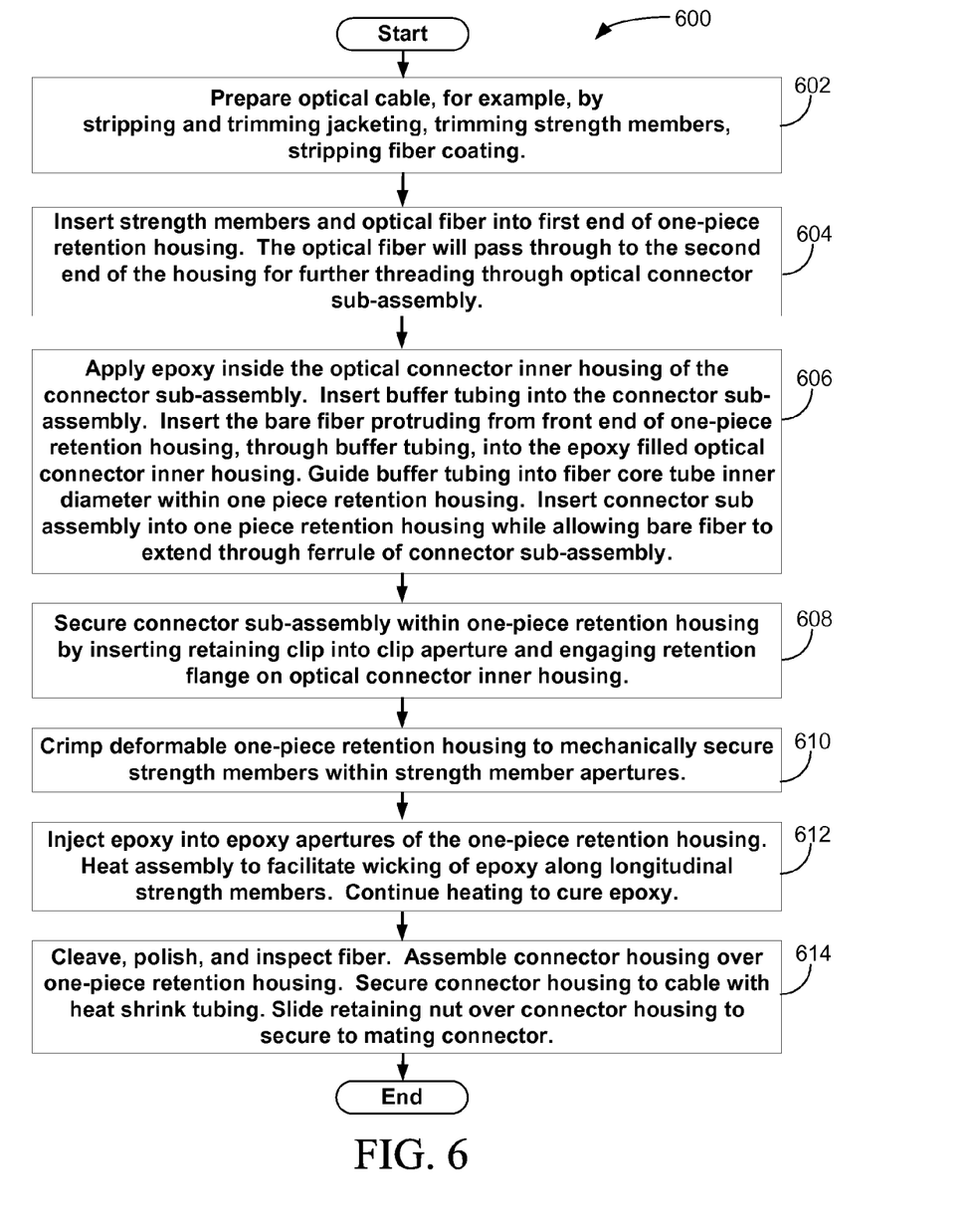
FIG. 6 is an example method flowchart for terminating and connectorizing an optical fiber cable, according to an example embodiment of the invention.

An example method for terminating and connectorizing an optical fiber cable will now be described with reference to the flowchart of FIG. 6. According to an example embodiment, the strength members 304, optical fiber 310 312, fiber core tube 306, and cable sheathing may be trimmed and prepared for appropriate coupling and engagement with the one-piece retention housing 212, optical connector sub-assembly 208 and additional connector housing 204 components. Unless otherwise noted, trimming and stripping lengths specified herein are referenced to the end of the cable sheathing 302, and are example lengths. Beginning with block 602, and with general reference to the FIGS. 1-5, the end of the optical fiber cable may be prepared by stripping and trimming the outer fiber optic cable jacketing or sheathing 302; trimming the strength members 304 to approximately 20 mm; trimming the fiber core tube 306 to approximately 18 mm; trimming the optical fiber 310 to approximately 55 mm; stripping the end of the optical fiber and coating 310 to remove the fiber coating, leaving approximately 40 mm of coated optical fiber and approximately 15 mm of the bare optical fiber 312 at the end; and carefully cleaning the bare optical fiber 312. As will become apparent below, various embodiments of the fiber preparation procedure may be advantageous for further assembly. For example, in one embodiment, the strength members 304 may be trimmed to unequal lengths to facilitate insertion of the strength members 304 into one-piece retention housing 212, one member at a time, rather than simultaneously.

The method for attaching the optical fiber assembly 306, 310, and 312 into to the one-piece retention housing 212 continues in block 604. The strength members 304 and elements of the optical fiber assembly 306, 310, and 312 may be inserted into optical fiber aperture 506 at the first end of the one-piece retention housing 212. The optical fiber assembly 306, 310, and 312 may be inserted through the optical fiber aperture 506 and into the optical fiber bore 522. As the optical fiber assembly 306, 310, and 312 is inserted into the optical fiber bore 522, the strength members 304 may be inserted through the strength member apertures 504 and into the strength member bores 520. As mentioned in the previous paragraph, strength members 304 may be trimmed to unequal lengths to facilitate insertion of the strength members 304 into the one-piece retention housing 212, one member at a time, rather than simultaneously. According to one embodiment of the invention, as the strength members 304 are inserted into the strength member bores 520, one or both of the ends of the strength members 304 may reach the end of the strength member bores 520, and may be limited from further travel. The optical fiber assembly 306, 310, and 312, however, may extend through the second end of the one-piece retention housing 212 for further threading through the optical connector sub-assembly 208.

The procedure for attaching the optical fiber assembly 306, 310, and 312 to optical connector sub-assembly 208 continues in block 606. Epoxy may be applied, for example, using a syringe, to the inside first end of the optical connector sub assembly 208 at the optical connector inner housing 406. A length of approximately 1 inch of buffer tubing 308 may be fully inserted into the inside first end of the optical connector sub assembly 208 at the optical connector inner housing 406. The bare fiber 312 protruding from the second end of the one-piece retention housing 212 may then be inserted into the epoxy-filled optical connector sub assembly 208, through the buffer tubing 308, and threaded through the ferrule 408. Block 606 continues by further inserting optical connector sub-assembly 208 into the optical connector sub-assembly aperture 410, while allowing the bare fiber 312 to continue sliding through the ferrule 408 of the optical connector sub assembly, so that the end of the optical connector inner housing 406 mates with the edge of the optical connector sub assembly bore 526 near the fiber and buffer transition region 514. This action may also push the buffer tubing 308 further into the fiber core tube 306. A small bead of epoxy may be placed at the end of ferrule 408 where the bare fiber 312 protrudes from the ferrule 408. After curing, this bead of epoxy may provide protection and support for the end of the bare optical fiber during cleaving and polishing.

Continuing in block 608, the optical connector sub-assembly 208 may be secured within the one-piece retention housing 212 by inserting the clip 402 into the clip bore 532 via the clip aperture 412, thereby engaging retention flange 404 of the optical connector inner housing 406. According to other embodiments, the optical connector sub-assembly 208 may be secured with other means such as epoxy or retaining pins, for example.

With reference now to block 610, the deformable one piece retention housing 212 may be mechanically secured to the strength members 304 within the strength member bores 520 by crimping the body of the one piece retention housing 212 in the crimping and epoxy region 512 so that the strength member bores 520 at least partially collapse upon the strength members 304. The crimping mechanism for performing this step may be hand-held, foot-operated, and/or pneumatic, and may provide sufficient force to crimp the housing without damaging the optical fiber. The crimping mechanism may further provide a means for directional crimping, including but not limited to circular or hexagonal crimping surfaces.

Continuing in block 612, epoxy may be injected into the epoxy apertures 414. The epoxy may flow through the epoxy bores 524 to the strength member bores 520, and to the strength members 304. Wicking action may distribute a portion of the epoxy in the space between the inside diameter of the strength member bores 520 and the outside diameter of the strength members 304. The wicking action may be further enhanced by heating the assembly to initially decrease the viscosity of the epoxy. Further heating may cure the epoxy within the strength member bores 520, and may also cure the bead of epoxy applied to the end of the ferrule, as described above in block 606. According to example embodiments of the invention, the diameter of the epoxy bores 524 may be sized for an optimum volume of epoxy, for example, so that a maximum amount of epoxy may wick along the strength members 304 without leaking out of the strength member apertures 504. According to other example embodiments of the invention, one or more epoxy apertures 414 and bores 524 may be utilized for each strength member bore 520 as needed to provide multiple points of access for the introduction of epoxy to each strength member 304 in a corresponding member bore 524. According to further example embodiments of the invention, epoxy may be introduced into the insertion recess 508, and may sufficiently wick into the strength member bores 520. In this embodiment, the epoxy apertures 414 and bores 524 may be eliminated.

With reference now to block 614, the end of the bare fiber 312 protruding from the ferrule 408 may be cleaved, polished, and inspected. Then the first end of the one-piece retention housing 212 may be inserted into the second end of the connector housing 204 to the point where the keyed retention housing collar 502 engages with a corresponding mating shoulder within the connector housing 204, as depicted in FIG. 2A. Heat shrink tubing may slide over the back end of the connector housing 204, and after heat is applied, may shrink to secure the connector housing 204 to the optical fiber cable assembly 102. The retaining nut 206 may slide over the connector housing 204 until the second end of the retaining nut 206 engages with an o-ring 210 adjacent to the connector housing collar 207. The boot 202 may be inserted over the heat shrink tubing 201 until it engages the first end of the retaining nut 206.

According to alternative embodiments of the method, epoxy may be applied to the strength members 304 before or after the crimping step.

It may be appreciated in the foregoing description of the assembly steps, particularly in block 604, that the one-piece retention housing 212 may provides a significant advantage over multiple-piece housings in terms of ease of assembly. The minimization of the number of pieces required to secure the fiber to the housing serves to reduce the difficulty in handling the various pieces. The one-piece retention housing 212 furthermore facilitates the wicking of epoxy onto the strength members 304 after securing with crimping, and therefore, may also eliminate a portion of the time and associated risk that may otherwise be required to pre-cure the epoxy.

According to example embodiments of the invention, the one-piece retention housing 212 may be made from malleable metals like anodized aluminum, nickel-plated brass, or metal injection molded stainless steel. According to other example embodiments of the invention, the one-piece retention housing 212 may be made from engineering plastics, or any material with suitable tensile or shear strength properties. According to example embodiments of the invention, the one-piece retention housing 212 may be manufactured, at least in part, by standard machining techniques including lathing, milling, and drilling, for example. The one-piece retention housing 212 may be alternatively manufactured by injection molding metal or plastic. According to example embodiments of the invention, the one-piece retention housing 212 may be manufactured using a combination of injection molding and standard machining techniques. According to example embodiments, the one-piece retention housing 212 may include textured or non-textured surfaces.

According to example embodiments an epoxy may be used for securing the strength members 304 to the one-piece retention housing 212 and for securing the coated 310 and non-coated optical fiber 312 within the optical connector sub-assembly 208. The preferred epoxy is heat curable, but may also include for example: anaerobic adhesive, 2-part epoxy, low viscosity epoxy, or high viscosity epoxy.

According to example embodiments, the invention can be a retention housing or part of a connector kit. The housing may include the one-piece retention housing 212, and may include an optional clip 402. The connector kit may include the one-piece retention housing 212, the clip 402, heat-shrink tubing 201, a boot assembly 202, a connector housing 204, a retaining nut 206, an optical connector sub assembly 208, O-rings 210, a dust cap, and/or a lanyard for attaching the dust cap to the connector housing 204.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

I claim:

1. A one-piece retention housing for use in terminating a cable, the cable having at least one strength member and at least one optical waveguide; the retention housing comprising:
    an elongated body having a longitudinal axis extending from a first end to a second end, the body defining:
        at least one waveguide bore extending from the first end to the second end and configured to receive the optical waveguide;
        at least one strength member bore extending from the first end toward the second end and configured to secure the at least one strength member to the housing;
        a crimping region disposed along at least a portion of a length of the strength member bore extending from approximate the first end towards the second end; and
        a connector bore disposed approximate the second end and configured to receive an optical connector sub-assembly that terminates the optical waveguide.

2. The retention housing of claim 1, wherein the body defines an outer surface, and wherein the body further defines a clip bore extending radially from the longitudinal axis and in communication with the outer surface, wherein the clip bore is configured to receive a clip for securing the optical connector sub-assembly.

3. The retention housing of claim 1, wherein the body defines an outer surface and wherein the body further defines at least one epoxy bore extending from the outer surface to the at least one strength member bore.

4. The retention housing of claim 1, comprising at least two strength member bores, wherein the strength member bores are symmetrically disposed about the waveguide bore.

5. The retention housing of claim 1, wherein the body is deformable in at least the crimping region.

6. The retention housing of claim 1, wherein the at least one strength member bore terminates prior to second end.

7. The retention housing of claim 1, wherein the body is metallic.

8. The retention housing of claim 1, wherein the waveguide bore is in communication with the connector bore.

9. The retention housing of claim 1, wherein the body defines a surface, and wherein the surface is an anodized surface.

10. The retention housing of claim 1, wherein the body defines a keyed retaining collar adjacent to the second end.

11. A connector plug assembly kit for terminating a cable, the cable having at least one strength member and at least one optical waveguide; the connector plug assembly kit further comprising:
    an optical connector sub-assembly that terminates the optical waveguide, the optical connector sub-assembly comprising a retention flange;
    a one-piece retention housing comprising an elongated body having a longitudinal axis extending from a first end to a second end, the body defining:
        at least one waveguide bore extending from the first end to the second end and configured to receive the optical waveguide;
        at least one strength member bore extending from the first end toward the second end and configured to secure the at least one strength member to the housing;
        a crimping section disposed along at least a portion of a length of the strength member bore extending from approximate the first end towards the second end; and
        a connector bore disposed approximate the second end and configured to receive the optical connector sub-assembly.

12. The connector plug assembly kit of claim 11, wherein the retention housing defines an outer surface, and wherein the retention housing further defines a clip bore extending radially from the longitudinal axis and in communication with the outer surface and the connector bore of the retention housing, and further comprising a clip configured to be received in the clip bore to secure the optical connector sub-assembly by engaging the retention flange.

13. The connector plug assembly kit of claim 11, further comprising an outer housing assembly including a shroud configured to receive the one-piece retention housing, the shroud comprising a shroud outer collar, and further comprising a shroud inner shoulder operable to engage and retain the one-piece retention housing.

14. The connector plug assembly kit of claim 13, further comprising a coupling nut configured to engage the shroud outer collar to secure the shroud, the one-piece retention housing, and the optical connector sub-assembly to a complementary receptacle.

15. The connector plug assembly kit of claim 13, wherein the body of the one-piece retention housing defines a keyed retaining collar adjacent to the second end operable to engage with the shoulder of the shroud of the outer housing to longitudinally retain and to restrict rotation of the one-piece retention housing about the longitudinal axis.

16. A method for terminating an optical fiber cable, the method comprising:
    preparing the optical cable to expose at least one strength member and optical fiber;
    providing a one-piece retention housing, the retention housing comprising:
        an elongated body having a longitudinal axis extending from a first end to a second end, the body defining:
            at least one waveguide bore extending from the first end to the second end and configured to receive the optical waveguide;
            at least one strength member bore extending from the first end toward the second end and configured to secure the at least one strength member to the housing;
            a crimping section disposed along at least a portion of a length of the strength member bore extending from approximate the first end towards the second end;
            a connector bore disposed approximate the second end and configured to receive an optical connector sub-assembly that terminates the optical waveguide;
    inserting the optical cable into the first end of the one-piece retention housing, wherein the at least one exposed strength member is inserted into the at least one strength member bore and the at least one exposed optical fiber is inserted into the waveguide bore so that a portion of the optical fiber extends past the second end;
    inserting the portion of the optical fiber extending past the second end into a connector sub-assembly;

inserting and securing the connector sub-assembly into the one-piece retention housing;

securing optical fiber and strength members within one-piece retention housing; and inserting one-piece retention housing into an outer housing shroud.

17. The method of claim 16, further comprises inserting a buffer tubing, approximately three centimeters in length, into the connector sub assembly, to support the optical fiber and ease insertion.

18. The method of claim 16 wherein securing the strength members within the one-piece retention housing comprises crimping the one-piece retention housing within the crimping section.

19. The method of claim 16, further comprises applying epoxy to a portion of the strength members within the strength member bores.

20. The method of claim 19 wherein the epoxy is heated to facilitate wicking and curing of the epoxy along the strength members.

* * * * *